Patented Sept. 5, 1950

2,520,958

UNITED STATES PATENT OFFICE 2,520,958

NICKEL RECOVERY

Henry Gordon Poole and Sol F. Ravitz, Salt Lake City, Utah, and Karl C. Dean, Bamberg, Germany, assignors to the United States of America as represented by the Secretary of the Interior No Drawing. Application January 14, 1947, Serial No. 722,012

8 Claims. (Cl. 23—117)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467.)

This invention relates to the recovery of nickel values and particularly to the production of nickel ammonium sulfate from low-grade nickel ore.

It is an object of the invention to provide a method for recovering nickel values from ore too low in grade to be treated economically by presently known processes. Other objects and advantages will be apparent or will appear hereinafter.

These objects are accomplished in accordance with the present invention by reacting oxidic nickel ore with ammonium sulfate at elevated temperatures, leaching the reaction products with an aqueous solution of ammonium hydroxide and ammonium carbonate, and separating the nickel ammonia sulfate solution so formed from the insoluble substances thereby precipitated.

The invention accordingly comprises the method for the recovery of nickel values.

Suitable ores for purposes of the invention include the oxidic and easily oxidizable ores of nickel such as sulfides, arsenides, and antimonides; the presently preferred ores being the oxidic ores such as garnierite ores since their use eliminates additional processing, for example calcination, to convert non-oxidic ores to oxidic ore.

Suitable leaching reagents include aqueous ammonium hydroxide, aqueous solutions of ammonium hydroxide and ammonium carbonate, and aqueous solutions of ammonium carbonate. While both dilute and concentrated solutions are effective, it is presently preferred to employ solutions having between about 50 to 90 percent by weight of water as such concentrations are found effective and create a satisfactory balance between ease of handling and rapidity of action.

In operation, the oxidic ore or calcined non-oxidic ore is mixed with ammonium sulfate and water and baked at temperatures of between about 300 to 600 degrees centigrade until fuming stops. The ammonia which is evolved during baking is recovered by passing the gases into a suitable absorbing means such as a packed tower through which water is passing counter-current to the gases, and the ammonium hydroxide thereby recovered can be recycled. After baking, the cake is leached with a solution of ammonium hydroxide and ammonium carbonate. Thereafter, the insoluble ore residue and the precipitated metal hydroxides such as iron, magnesium and aluminum are separated from the soluble nickel salts by suitable separating means such as filtration. The filtrate consists essentially of a solution of ammonium sulfate and the complex compound known as nickel ammonia sulfate or nickel ammine sulfate, together with the excess of ammonia and ammonium carbonate used in leaching. This solution is evaporated and the ammonia evolved is recovered as above for reuse. On continued evaporation, crystals of the double salt, nickel ammonium sulfate, will separate from the strong ammonium sulfate solution due to its sparing solubility therein. The crystalline salt is separated from the solution by filtration or other suitable means and the filtrate can be recycled, with or without further evaporation, and used in the baking of the ore.

If it is desired, the nickel ammonium sulfate can be converted to nickel or other nickel substances by known electrolytic or chemical procedures.

The following example shows how the invention may be carried out, but it is not limited thereto. Percentages are by weight unless designated to the contrary.

Example I

A low-grade nickel ore, essentially a garnierite ore, having the following analysis:

| Components: | Per cent |
|---|---|
| Ni | 1.66 |
| MgO | 20.2 |
| Fe | 5.05 |
| $Al_2O_3$ | 0.8 |
| $SiO_2$ | 57.1 |
| S | 0.01 | was ground to minus 80 mesh. A mixture of 200 grams of the ore, 200 grams of ammonium sulfate, and 40 grams of water was placed in a porcelain dish and baked in an electric muffle furnace and baked for 5 hours at about 400 degrees centigrade, then allowed to cool to about room temperature.

Thereafter, 1400 milliliters of a solution of 20 percent ammonium hyroxide and 20 percent ammonium carbonate was added to the baked product and the mixture agitated for about one hour. The resulting slurry was filtered. The filtrate was evaporated to 165 milliliters, whereupon 95 percent of the nickel in the solution crystallized out as crystals having a composition approximating $Ni(NH_4)_2(SO_4)_2 6H_2O$. These crystals were filtered off. The filtrate was recycled through the system with another charge of 200 grams of ore. In the recycling, the mixture of ore and filtrate was first evaporated to dryness and then 78 grams of ammonium sulfate was admixed with the dry product. The mixture was then processed as described above. In a 6-cycle operation an average of about 82 percent of the nickel was extracted from the ore and recovered.

As shown in the foregoing description and examples, nickel values can easily and economically be recovered from low-grade ores by reacting the ore with ammonium sulfate and leaching the nickel values from the reacted mixture with a solution of ammonium hydroxide and ammonium carbonate. By said process, the extracting (baking and leaching) reagents can be substantially recovered in usable forms for recycling through the system.

While the invention as particularly described relates to the recovery of nickel values, it is not limited thereto; other similar metals, such as copper and cobalt, can be extracted from their ores by this process.

While the invention as particularly described relates to the treatment of a low-grade nickel ore of the garnierite type under conditions that were ascertained to be optimum for that specific ore, the invention is not limited thereto; such conditions as particle size, proportion of ammonium sulfate, baking temperature, baking time, proportion of moisture in the charge to the baking furnace will vary to some extent with the nature of the ore.

While the invention as particularly described leaches a cooled cake, it is not limited thereto, but it is preferred because it minimizes reagent losses and is a safer procedure if the cake is substantially below the boiling point of the leach solution.

Since many apparently widely differing embodiments of the invention will occur to one skilled in the art, the invention is not limited to the specific details illustrated and described, and various changes can be made therein without departing from the spirit and scope thereof.

What is claimed is:

1. The process for the production of nickel ammonium sulfate which comprises reacting oxidic nickel ore with ammonium sulfate at elevated temperatures of about 400 degrees centigrade, treating the reaction product so formed with an aqueous solution of ammonium hydroxide and ammonium carbonate, separating the insoluble substances and the mother liquor whereby the nickel values are converted to nickel ammonia sulfate in solution with ammonium sulfate; evaporating said solution thereby precipitating nickel ammonium sulfate in the ammonium sulfate solution; and separating the solution therefrom to recover nickel ammonium sulfate crystals.

2. The method of producing nickel ammonium sulfate from garnierite ore having a nickel content of about 1.66 percent by weight which comprises crushing the garnierite to about minus 80 mesh; heating 200 grams of the crushed ore, 200 grams of ammonium sulfate, and 40 grams of water to temperatures of about 400 degrees centigrade until fuming stops; cooling the heated reaction products to about room temperature; adding thereto 1400 milliliters of an aqueous solution of 20 percent by weight of ammonium hydroxide and 20 percent by weight of ammonium carbonate, agitating the slurry while equilibrium is being established; filtering the slurry; evaporating the filtrate to about 165 milliliters; and filtering off and recovering thereby nickel ammonium sulfate crystals.

3. The process for the production of nickel ammonium sulfate which comprises heating oxidic nickel ore and ammonium sulfate to temperatures between about 300 and 600 degrees centigrade, leaching the reaction mixture with an aqueous ammonium hydroxide solution, separating the insoluble materials and the mother liquor, evaporating the mother liquor until nickel ammonium sulfate crystals precipitate, and separating and recovering the nickel ammonium sulfate crystals.

4. The process for the production of nickel ammonium sulfate which comprises heating oxidic nickel ore and ammonium sulfate to temperatures between about 300 and 600 degrees centigrade, leaching the reaction mixture with an aqueous solution of ammonium hydroxide and ammonium carbonate, separating the insoluble materials and the mother liquor, evaporating the mother liquor until nickel ammonium sulfate crystals precipitate, and separating and recovering the nickel ammonium sulfate crystals.

5. The process for the production of nickel ammonium sulfate which comprises calcining non-oxidic nickel ore, heating the oxidic nickel ore formed thereby with ammonium sulfate to temperatures between about 300 and 600 degrees centigrade, leaching the reaction mixture with an aqueous ammonium hydroxide solution, separating the insoluble materials and the mother liquor, evaporating the mother liquor until nickel ammonium sulfate crystals precipitate, and separating and recovering the nickel ammonium sulfate crystals.

6. The process for the production of nickel ammonium sulfate which comprises calcining non-oxidic nickel ore, heating the oxidic nickel ore formed thereby with ammonium sulfate to temperatures between about 300 and 600 degrees centigrade, leaching the reaction mixture with an aqueous solution of ammonium hydroxide and ammonium carbonate, separating the insoluble materials and the mother liquor, evaporating the mother liquor until nickel ammonium sulfate crystals precipitate, and separating and recovering the nickel ammonium sulfate crystals.

7. The process for the production of nickel ammonium sulfate which comprises heating a mixture of oxidic nickel ore, ammonium sulfate, and water to temperatures between about 300 and 600 degrees centigrade, leaching the reaction mixture with an aqueous ammonium hydroxide solution, separating the insoluble materials and the mother liquor, evaporating the mother liquor until nickel ammonium sulfate crystals precipitate, and separating and recovering the nickel ammonium sulfate crystals.

8. The process for the production of nickel ammonium sulfate which comprises heating oxidic nickel ore and ammonium sulfate to temperatures between about 300 and 600 degrees centigrade, leaching the reaction mixture with an aqueous ammonium hydroxide solution, separating the insoluble materials and the soluble nickel values in solution with ammonium sulfate, evaporating said solution thereby precpitating nickel ammonium sulfate in the ammonium sulfate solution and separating the solution therefrom to recover nickel ammonium sulfate crystals and an ammonium sulfate solution which is recycled through the system with another charge of ore.

H. GORDON POOLE.
SOL F. RAVITZ.
KARL C. DEAN.

REFERENCES CITED

The following references are of record in the file of this patent:

UNITED STATES PATENTS

| Number | Name | Date |
| --- | --- | --- |
| 1,258,934 | Nitchie | Mar. 12, 1918 |
| 1,487,145 | Caron | Mar. 18, 1924 |
| 1,590,525 | Kichline | June 29, 1926 |
| 1,851,385 | Ashcraft | Mar. 29, 1932 |
| 2,176,775 | Sweet et al. | Oct. 17, 1939 |